Patented July 7, 1953

2,644,803

UNITED STATES PATENT OFFICE 2,644,803

SPINNING SOLUTIONS COMPRISING AN ACRYLONITRILE-ALLYL ALCOHOL COPOLYMER

Arthur Cresswell, Stamford, Conn., assignor to American Cyanamid Company, New York, N. Y., a corporation of Maine No Drawing. Application February 15, 1949, Serial No. 76,668

6 Claims. (Cl. 260—29.6)

This application is a continuation-in-part of my copending applications Serial Nos. 25,802 and 25,803, filed May 7, 1948, and now abandoned.

This invention relates broadly to spinning solutions comprising an acrylonitrile-allyl alcohol copolymer. Specifically the invention is concerned with the production of synthetic fibers or yarns from certain acrylonitrile-allyl alcohol copolymers, and especially with the production of synthetic fibers which show molecular orientation along the fiber axis (that is, show, by characteristic X-ray patterns, orientation along the fiber axis) and wherein the material of which the fiber is formed comprises an acrylonitrile-allyl alcohol copolymer which is the product of polymerization of a mixture of comonomers consisting of acrylonitrile and allyl alcohol in a weight ratio of from 85 to 93 parts of the former to from 15 to 7 parts of the latter.

Since allyl alcohol and acrylonitrile polymerize at different rates, all other conditions being the same, the rate at which allyl alcohol enters into the copolymer molecules is slower than the rate at which the chain of acrylonitrile units is growing by polymerization, the ultimate result being that the weight percentage of combined allyl alcohol in the final copolymer is usually substantially less than its weight percentage in the original mixture of monomers. Hence the novel synthetic fibers resulting from this invention also may be defined as being molecularly oriented copolymers of acrylonitrile and allyl alcohol in the form of a fiber, which copolymers contain from 0.6% (about 0.6%) to 7% (about 7%) by weight thereof of combined allyl alcohol. Or, otherwise stated, the copolymers contain from 93% (about 93%) to 99.4% (about 99.4%) by weight thereof of acrylonitrile combined in the copolymer molecules, the remainder being combined allyl alcohol. The percentage composition may be calculated from, for example, the results of a nitrogen analysis of the copolymer.

In the copending application of Edward L. Kropa and Arthur S. Nyquist, Serial No. 76,656, filed concurrently herewith, there are disclosed compositions of matter comprising the product of polymerization of a mixture of comonomers consisting of (1) acrylonitrile and (2) an unsaturated alcohol of the class consisting of allyl alcohol and methallyl alcohol in a weight ratio of from 25 to 95 parts of the acrylonitrile of (1) to from 75 to 5 parts of the unsaturated alcohol of (2); and a method of preparing a new synthetic material which comprises polymerizing such a mixture of comonomers (copolymerizable monomers). The claimed invention is directed to compositions wherein the proportions of acrylonitrile and of the aforesaid unsaturated alcohol are such that the polymerization product contains from 15 to 30 percent by weight of the said unsaturated alcohol, the remainder being acrylonitrile; and to processes of preparing copolymers from mixtures of acrylonitrile and the aforementioned unsaturated alcohol. The invention claimed in my copending application Serial No. 76,667, also filed concurrently herewith, is directed to certain new and useful improvements in a method of producing a copolymer of the kind used in preparing the spinning solutions of the present invention.

To the best of my knowledge and belief it was not known or suggested prior to the invention of Kropa and Nyquist disclosed in their aforementioned copending application that there could be produced any copolymers of acrylonitrile and allyl alcohol, nor was it known or suggested prior to my inventions disclosed and claimed herein and in my aforementioned copending application Serial No. 76,667 that the particular acrylonitrile-allyl alcohol copolymer used in practicing the present invention could be produced economically and without difficulty by the new and improved method disclosed and claimed in my copending application just mentioned, or that stretched or oriented synthetic fibers could be produced from these particular acrylonitrile-allyl alcohol copolymers as disclosed in the present application or as disclosed in my aforementioned copending applications Serial Nos. 25,802 and 25,803.

The invention involved in my copending application Serial No. 76,667 is based on my discovery that the copolymerization reaction between acrylonitrile and allyl alcohol is unique in that, in order to obtain a copolymer which is especially adapted for use in wet spinning a stretchable fiber therefrom, particular proportions of monomers and particular conditions of copolymerization are required. This is necessary in order to obtain a copolymer which (1) has an average molecular weight and other characteristics such that a commercially useful spinning solution can be produced therefrom and (2) has a sufficient amount of allyl alcohol combined in the copolymer molecules so that the benefits (e. g., greater stretchability of the spun, gelled fiber with resulting advantages; warmer hand or feeling to the touch of the finished, oriented fiber; etc.) accruing from the presence of the combined allyl alcohol can be attained; but, on the other hand, not such an excessive amount of combined allyl alcohol that the wet-strength characteristics and other desirable properties of the finished, oriented fiber will be detrimentally affected. From this it will be seen that a critical balance is required in the composition of the copolymer if it is to be used in producing a synthetic fiber having optimum properties. Due probably to the presence of primary hydroxyl groups in the copolymer chain, the regenerated copolymer as formed in a cold aqueous coagulating bath is glass-clear, which is indicative of copolymer hydration. This property probably contributes substantially to the improved stretchability of the water-swollen copolymer in film or gel state.

More particularly the invention involved in my copending application Serial No. 76,667 resides in my discovery that an acrylonitrile-allyl alcohol copolymer which meets the aforementioned requisites and which is suitable for spinning (specifically wet spinning) a solution thereof to yield a stretchable fiber having improved characteristics can be produced by first forming an aqueous solution containing (1) from 5% to 7.2% (more particularly from about 5.5% to about 6.5%) by weight thereof acrylonitrile, (2) allyl alcohol in an amount corresponding to from 7% to 15% (more particularly from about 9% to about 12%) by weight of the total acrylonitrile and ally alcohol, and (3) a water-soluble additive comprising a water-soluble catalyst for accelerating copolymerization between the said acrylonitrile and allyl alcohol, the said catalyst being effective in the said aqueous solution when the latter is maintained at a temperature within the range of 0° to +10° C. The reaction between the acrylonitrile and allyl alcohol is allowed to proceed in the aqueous solution, with or without agitating the solution as desired or as conditions may require, and while maintaining the solution within the aforementioned temperature range until there has been obtained an acrylonitrile-allyl alcohol copolymer which yields a solution having a specific viscosity at 40° C. within the range of 2 to 10 when 1 gram of the copolymer is dissolved in 100 ml. of 60% aqueous sodium thiocyanate solution.

A copolymer which meets the aforementioned requirement with regard to the specific viscosity at 40° C. of the above-mentioned sodium thiocyanate solution, and which is useful in carrying the present invention into effect, will usually have an average molecular weight within the range of about 54,000 to about 200,000, and a content of combined allyl alcohol within the range of about 0.6% to about 5 or 6%, or in some cases even as high as 7% or more, by weight of the copolymer. (The average molecular weight may be determined, for example, from a viscosity value of a dimethyl formamide solution of the copolymer and calculations by means of the Staudinger equation; reference: U. S. Patent No. 2,404,713.) If the amount of allyl alcohol in the solution is less than about 7% by weight of the total acrylonitrile and allyl alcohol employed, the final copolymer will not contain enough combined allyl alcohol to provide an improved copolymer composition for spinning from a solution thereof. On the other hand, if the amount of allyl alcohol in the solution is more than about 15% by weight of the total acrylonitrile and allyl alcohol used, the final copolymer will contain more combined allyl alcohol than is desirable for optimum results and, when other polymerization conditions are the same, will have a lower molecular weight and will be less amenable to wet or dry spinnings, a satisfactory stretchable fiber from a solution thereof than when the allyl alcohol constitutes not more than 15% by weight of the total monomers in the solution.

Various methods of producing filaments, films and other shaped articles from acrylonitrile (polymeric acrylonitrile) and from copolymers or interpolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaternary ammonium compound such as benzyl pyridinium chloride, and that the resulting solution be employed in making films, threads and other shaped bodies therefrom. Also, in Rein U. S. Patent 2,140,921 it is proposed that various polyvinyl compounds including polyacrylonitrile and copolymers of acrylonitrile with another vinyl compound be dissolved in concentrated aqueous solutions of inorganic (metallic) salts, e. g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in U. S. Patents 2,404,713–728, and also the use of such solutions in forming films, filaments, etc., therefrom.

The synthetic fibers produced from the spinning solutions of this invention and which show, by characteristic X-ray patterns, orientation along the fiber axis may be prepared from the above-mentioned acrylonitrile-allyl alcohol copolymers by various methods. For instance, they may be produced by methods such as are disclosed in my aforementioned copending applications or by methods such as those described in U. S. Patents 2,404,713–728. However, I prefer to prepare my new synthetic fibers by methods such as are disclosed and broadly claimed in my copending applications Serial No. 772,200, filed September 4, 1947, now Patent No. 2,558,730, dated July 3, 1951, Serial No. 68,370, filed December 30, 1948, and Serial No. 73,078, filed January 27, 1949. Serial No. 68,370 has now been abandoned in favor of the aforesaid application Serial No. 73,078, the latter application being a continuation-in-part of the former and said application Serial No. 73,078 having now matured into Patent No. 2,558,731, dated July 3, 1951.

The invention disclosed and claimed in my copending application Serial No. 772,200, filed September 4, 1947, is based on my discovery that useful films, filaments, threads and other shaped articles, which are capable of being dyed, can be produced from acrylonitrile polymerization products of the kind described therein and in the aforementioned patents by precipitating or coagulating the polymerization product in approximately its desired shape from a water-coagulable solution thereof (e. g., concentrated aqueous salt solutions of the kind disclosed by Rein in his Patent No. 2,140,921), the precipitation being effected by contacting the said solution with a cold liquid coagulant comprising water, more particularly such a coagulant which is at a temperature not substantially exceeding +10° C. This coagulant is a non-solvent for the polymerization product but will dissolve the solvent in which the said product is dissolved. Surprisingly it was found that by keeping the temperature of the aqueous coagulating bath at or below +10° C., e. g., within the range of −15° C. to +10° C. and preferably at from about −15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product. In marked contrast, if temperatures materially above +10° C. be employed, e. g., temperatures of the order of 20° to 50° C. or higher, the precipitated gels in general are hazy or opaque, weak, friable, have little or no toughness or ductility and are not adapted for stretching to orient the molecules and thereby improve the properties of the dried material.

The invention disclosed and claimed in my aforementioned copending application Serial No. 772,200 is based on my further discovery that the shaped, precipitated gels, e. g., extruded, water-swollen monofilaments and multifilaments, which may be collectively designated as yarns or fibers, and which have been formed in a cold liquid coagulant comprising water at a low temperature of the order of that mentioned in the preceding paragraph, can be materially improved in properties by subjecting the precipitated material in wet, swollen state to tension, as by stretching, in contact with moisture or water and at an elevated temperature, specifically at a temperature within the range of about 70° C. to about 110° C. Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam may be employed. For optimum results during stretching it is important that moisture or water be present. By thus wet stretching the precipitated product, more particularly to an extent at least twice its original length (that is, at least 100%) and preferably from 3 to 20 or more times its original length, the molecules are oriented along the fiber axis and a product having increased tensile strength, pronounced fibrillation, toughness, resilience and other improved properties is obtained.

The invention disclosed and originally claimed in my aforementioned copending application Serial No. 68,370 is concerned with certain new and useful improvements in the process of producing yarns or fibers from polymers and copolymers of acrylonitrile as disclosed and claimed in my aforementioned copending application Serial No. 772,200, and more particularly to an improved process whereby the stretched, water-swollen or aquagel fiber of the acrylonitrile polymerization product can be continuously dried, or, preferably, both continuously spun, stretched and dried whereby a fiber or thread is obtained more quickly and with a minimum of handling so that the product is more uniform and is less subject to damage during processing than, for example, a package-spun fiber or thread.

The invention disclosed and claimed in my copending application Serial No. 73,078 likewise is concerned with certain new and useful improvements in the process of producing yarns or fibers from polymers and copolymers of acrylonitrile as disclosed and claimed in my aforementioned copending application Serial No. 772,200; and, in accordance with one embodiment, with the new and novel improvement, which was disclosed but not claimed in my aforementioned copending application Serial No. 68,370, and which consists in the step of stretching the gelled fiber of acrylonitrile polymerization product in the presence of moisture, at a temperature within the range of about 70° C. to about 100° C. and, also, while it is in a line which is tangent to two rotating circular surfaces and between which there is no other point of solid frictional contact, the peripheral speed of one of the said rotating surfaces being greater than that of the other thereby to maintain the gelled fiber under tension.

Another novel feature of the invention of my copending application Serial No. 73,078 involves the step of applying to the gelled fiber (that is, after coagulation of the solution containing the polymeric or copolymeric acrylonitrile in a bath of a cold liquid coagulant comprising water) a cold liquid treating agent comprising water while the said gelled fiber is moving in a helical path. This liquid treating agent likewise should be at a temperature not exceeding +10° C., for example at a temperature within the range of −15° C. to +10° C., and preferably at a temperature of about 0° C. to about +5° C. This cold liquid treating agent, which is preferably composed of water at a low temperature such as has been mentioned before, is advantageously applied to the gelled fiber while the fiber is moving in a helical path in contact with a smooth rotating surface which likewise is at a temperature not exceeding +10° C. The rotating surface may take the form of a pair of cylindrical rolls upon which helices of the gelled fiber advance from the feed-on end to the take-off end. These rolls advantageously may be tilted at a suitable angle, for instance, at an angle of about 2° to about 10°, e. g., about 5°; and the liquid treating agent applied at the take-off end of one or both of the rolls whereby the fiber is countercurrently treated or washed with the treating or washing agent. By the application of, for example, cold water to advancing helices of the gelled fiber, any traces of water-soluble impurities which may be present in the fiber or on its exterior surfaces, such, for example, as traces of salts, solutions of which may have been used in dissolving the acrylonitrile polymerization product, will be removed from the gelled fiber prior to the stretching operation. The removal of traces of such water-soluble impurities is advantageous in that it permits optimum stretching of the gelled fiber with resulting improvement in the properties of the final product.

The final step of the process of my copending application Serial No. 73,078 comprises drying the stretched or oriented fiber. This may be done by conventional methods such as by drying at room temperature on a bobbin or other device on which the gelled fiber may have been collected; or drying may be effected continuously by the use of heated, convergent rolls such as are described in my aforementioned copending application Serial No. 68,370.

In carrying my invention into effect on acrylonitrile-allyl alcohol copolymer of the kind described in the second paragraph of this specification is first prepared by any suitable method. One suitable method of preparing such a copolymer is disclosed and claimed in my aforementioned copending application Serial No. 76,667, which method has been briefly described hereinbefore. Other methods of preparing suitable acrylonitrile-allyl alcohol copolymers for making the synthetic fibers or yarns of the present invention also may be employed.

When the preferred method or methods of producing synthetic fibers from these new acrylonitrile-allyl alcohol copolymers are followed (see my aforementioned copending applications Serial Nos. 772,200, 68,370 and 73,078 for more detailed descriptions with reference to drawings illustrative of apparatus that may be used in practicing the claimed method inventions), the acrylonitrile-allyl alcohol copolymer is then dissolved in a solvent from which the copolymer is precipitated or coagulated when the solution is brought into contact (e. g., immediately after extrusion) with a liquid coagulant comprising water, more particularly water which is at a temperature not exceeding substantially +10° C., preferably at or below +5° C., e. g., at from −10° C. to +5° C. Examples of such solvents are concentrated aqueous solutions of water-soluble inorganic salts, more particularly such salts which yield highly hydrated ions in aqueous solutions, e. g., the chlorides, bromides, iodides, thiocyanates, perchlorates and nitrates, which salts are disclosed in the aforementioned Rein Patent No. 2,140,921 and the concentrated aqueous solutions of which are the preferred solvents for the acrylonitrile-allyl alcohol copolymer in carrying the present invention into effect. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. These solutions containing dissolved polymeric or copolymeric acrylonitrile are more fully described and are specifically claimed in my copending application Serial No. 772,201, filed September 4, 1947, now Patent No. 2,533,224, issued December 12, 1950. I prefer to use a concentrated aqueous solution of calcium thiocyanate as the solvent for the acrylonitrile-allyl alcohol copolymer. The solution of the acrylonitrile-allyl alcohol copolymer in the chosen solvent should be of such a concentration that a composition having a workable viscosity is obtained. The concentration of the copolymer will depend, for example, upon the particular solvent and extrusion apparatus employed, the diameter of the fiber to be spun and the average molecular weight of the copolymer, which is within the range of about 54,000 to about 200,000, and advantageously is of the order of about 60,000 or 70,000 to about 140,000 or 150,000. The concentration of copolymer may range, for example, from 7 or 8% up to 12 or 14% or more by weight of the solution. The viscosity of the solution, as determined by measuring the time in seconds for a Monel metal ball ⅛ inch in diameter to fall through 20 cm. of the solution at 61° C., may be, for instance, from 20 to 200 seconds. Usually the best spinning solutions from the standpoint of coagulation and optimum properties of the precipitated gel are those which contain the highest concentration of acrylonitrile-allyl alcohol copolymer and the lowest concentration of zinc chloride, sodium or calcium thiocyanate, guanidine thiocyanate or other salt of the kinds aforementioned, which concentrations are consistent with solubility and viscosity limitations. A concentration of about 7 or 8% acrylonitrile-allyl alcohol copolymer in about 48–60% calcium thiocyanate solution is usually very satisfactory. The viscosity of the solution should not be so high that it is difficult to filter or to stir and de-aerate prior to use.

In producing the synthetic fibers from the spinning solutions of the present invention by my preferred method, the bath in which the solution of the acrylonitrile-allyl alcohol copolymer is coagulated is at a temperature not exceeding substantially +10° C., and preferably at or below +5° C., e. g., −10° C. to 0° C. or +1° C. or +2° C. Temperatures below −15° C., e. g., −20° C. or lower, may be employed if desired, but such temperatures are more costly to secure and maintain, and no particular advantages appear to accrue therefrom. By the use of a low-temperature, aqueous coagulating bath as described herein and in my aforementioned copending applications Serial Nos. 772,200, 68,370 and 73,078 the shaped, coagulated or precipitated material, more particularly an extruded, water-swollen or gelled fiber or thread formed of acrylonitrile-allyl alcohol copolymer, is clear (transparent) or substantially clear, cohesive, has considerable elasticity and toughness, and is capable of being oriented, e. g., by stretching.

The spun fibers of acrylonitrile-allyl alcohol copolymer are treated after leaving the coagulating bath in order to orient the molecules and thereby to increase the tensile strength and otherwise to improve the properties of the spun material. It was surprisingly found that wet, gelled fibers of the acrylonitrile-allyl alcohol copolymers used in practicing the present invention can be stretched to a higher degree (i. e., they have greater stretchability), other conditions being the same, than similar gelled fibers produced from polymeric acrylonitrile. As will be readily understood by those skilled in the art, this is a matter of considerable practical importance, since the higher the degree of stretch, the higher usually is the degree of orientation of the molecules along the fiber axis and the more valuable is the final, oriented fiber.

Stretching or orientation may be effected, for instance, as is described and illustrated in my aforementioned copending applications Serial Nos. 772,200, 68,370 and 73,078. Preferably orientation is effected by stretching the fiber of acrylonitrile-allyl alcohol copolymer, while still in its water-swollen or gel state, in the presence of moisture, at a temperature within the range of about 70° C. to about 100° C., more particularly at a temperature of about 90° C. to about 100° C., and while it is in a line which is tangent to two rotating circular surfaces and between which there is no other point of solid, frictional contact. Such stretching may be effected, for example, as illustrated in Fig. 1 of the drawing accompanying my copending application Serial No. 68,370, and also as shown in the various figures of the drawing accompanying my copending application Serial No. 73,078.

The amount of stretch that is applied to the water-swollen or gelled fiber may be varied widely, but in all cases should be sufficient to cause at least appreciable orientation of the molecules and an improvement in the properties of the fiber formed of acrylonitrile-allyl alcohol copolymer. Depending, for example, upon the particular acrylonitrile-allyl alcohol copolymer which is being stretched or elongated and the particular properties desired in the finished product, the amount of stretch may vary, for instance, from 100%, preferably from 200 or 300%, up to 2000% or more of the original length of the fiber.

The stretched or oriented gelled fiber is collected on a suitable collecting device, e. g., a bobbin. It may be treated in the gel state with a humectant, an anti-static finishing composition, a dye or other treating agent as described, for instance, in my aforementioned copending applications Serial Nos. 772,200, 68,370 and 73,078, in my copending application Serial No. 772,202 and in Pollard copending application Serial No. 772,217 (both of which latter two applications were filed September 4, 1947), with reference to the broad class of polymers and copolymers of acrylonitrile, in gel state, which are described therein. The aforementioned application Serial No. 772,202 has now been abandoned in favor of my copending application Serial No. 182,296, filed August 30, 1950, as a continuation-in-part of said application Serial No. 772,202 and has now matured into Patent No. 2,558,735, dated July 3, 1951. The aforementioned Pollard application Serial No. 772,217 has now matured into Patent No. 2,558,781, dated July 3, 1951.

The gelled fiber, which may or may not have been dyed or otherwise treated as described briefly above and more fully in the aforementioned copending applications, is then dried by any suitable means to the desired degree. For example, the gelled fiber may be dried merely by allowing the bobbin containing the same to stand at room temperature, or it may be heated at a temperature within the range of, say, 40° C. to 120° C. for a period sufficient to dry the wet gel to an irreversible state. Or, a pre-dyed thread may be produced by circulating a suitable dye, e. g., an acetate dye, through the thread package, followed by a water wash and finally, if desired, it may be immersed in a bath of a suitable anti-static and lubricating composition. The thread is then dried and, in the case of bobbin-spun thread or yarn, thereafter may be twisted and wound into packages. Pot-spun yarn may be wound directly. In the case of thread or yarn which is to be dyed later in cloth form, a treating bath containing an aqueous solution of a humectant may be applied to the thread as described and broadly claimed originally in my aforementioned copending application Serial No. 772,202, wherein further information with regard to dyeing a gelled fiber with an acetate dye is given. The twisted thread is then dried at a temperature and for a time insufficient to convert the gel to an irreversible state, after which it may be twisted and packaged as described above.

Alternatively, the stretched, gelled fiber may be continuously dried, after being pretreated with a liquid composition containing an anti-static agent, using apparatus and the same general processes described in my aforementioned copending applications Serial Nos. 68,370 and 73,078.

Oriented synthetic fibers also may be produced from the acrylonitrile-allyl alcohol copolymers used in practicing the present invention by dissolving the copolymer in a suitable organic solvent, e. g., solvents such as are mentioned in the aforementioned U. S. Patents 2,404,713–728, and then wet or dry spinning the solutions of the copolymer as therein described. A suitable dry-spinning cell is illustrated in, for instance, U. S. Patent No. 2,404,714.

In order that those skilled in the art better may understand how the present invention may be carried into effect, the following examples are given by way of illustration and not by way of limitation. All parts and percentages are by weight.

Example 1

A copolymer of acrylonitrile and allyl alcohol was prepared, using 90 parts of acryonitrile and 10 parts of allyl alcohol, as follows: Ninety (90) parts of acrylonitrile, 10 parts of allyl alcohol, 1390 parts of water, 0.75 part of ammonium persulfate and 0.375 part of silver nitrate were mixed together and the mixed monomers were caused to copolymerize by maintaining the reaction mass at 40° C. and stirring it for 4 hours, after which the copolymer was isolated by filtration, washed with water and dried. The yield of copolymer was 56.7% of the theoretical. The results of an analysis of the copolymer for nitrogen showed that it contained about 2.9% of combined allyl alcohol. One gram of this copolymer, dissolved in 100 ml. of 60% aqueous sodium thiocyanate, gave a solution having a viscosity at 40° C. of 18.3 centipoises, which is equivalent to a specific viscosity at 40° C. of 2.45. (The specific viscosity equals $$\frac{\text{viscosity of solution}}{\text{viscosity of solvent}} - 1)$$

This copolymer had an average molecular weight of about 64,000.

Seven and one-tenth (7.1) parts of the above copolymer was dissolved in 92.9 parts of 48% aqueous calcium thiocyanate to give a solution having a viscosity at 61° C. of 22.7 seconds, as measured by the time for a Monel metal ball, ⅛ inch in diameter, to fall through 20 cm. of the solution. After filtering and de-aerating, this solution was extruded through a 40-hole spinneret, with holes 120 microns in diameter, into water at 1–2° C. The gel thread was led back and forth in the aqueous coagulating bath for a travel of 240 cm. and thence to a godet of 16 cm. circumference, about which it was wrapped twice. The thread was then led to a second godet of 39.3 cm. circumference, which latter godet was rotating at the same number of revolutions per minute as the first godet, so that a 2.45-fold stretch was applied. The thread was wrapped three times around the second godet. The gel thread was now led through water at 98–99° C. and thence to a third godet of 39.3 cm. circumference, about which the thread was wrapped twice. This godet rotated 4.16 times as fast as the second godet, so that the total stretch between the first and third godets was 10.2-fold or 920% stretch. The thread then was wound upon a bobbin.

After drying, the thread had a denier of 184, with a dry tenacity of 3.8 grams per denier, a wet tenacity of 3.53 grams per denier, a dry elongation of 13% and a wet elongation of 14.5%.

The stretched or oriented thread, while in the gel state, was immersed in solutions containing 1 gram per liter of Safranine GF (Color Index No. 841) and of Victoria Blue 4R (Color Index No. 690), which are cellulose-substantive dyestuffs. After dyeing for 1 hour at 40° C., the resulting dyed threads were washed for 2 hours with changing water, after which the threads were allowed to dry. Both threads were dyed very deeply.

By way of comparison with the results obtained with the above-described copolymer of acrylonitrile and allyl alcohol, a solution of polyacrylonitrile (polymeric acrylonitrile) having an average molecular weight of about 72,000 was spun with the same spinning arrangement and with the coagulating and stretch baths maintained at the same temperatures. The calcium thiocyanate solution of the polyacrylonitrile contained 6.83% of polymer and had a ball-fall viscosity (described above) at 61° C. of 21.0 seconds. After extruding through a 40-hole spinneret, with holes 120 microns in diameter, into water at 1-2° C., it was found that the gel thread could be stretched only 7.45 fold (645% stretch) between the first and third godets. After drying, the thread had a denier of 177, a dry tenacity of 2.63 grams per denier, a wet tenacity of 2.18 grams per denier, a dry elongation of 7% and a wet elongation of 9%.

The following examples illustrate how synthetic fibers formed of an acrylonitrile-allyl alcohol copolymer of the kind used in practicing the present invention may be treated, if necessary or desired, in order to remove color that may be present therein. For further information on these treating methods reference is made to my aforementioned copending applications Serial Nos. 25,802 and 25,803 of which the present application is a continuation-in-part.

Example 2

An acrylonitrile-allyl alcohol copolymer containing about 2.8% of combined allyl alcohol is dissolved in 48% aqueous calcium thiocyanate solution to form a solution containing about 7% of copolymer. The viscosity of the resulting spinning solution is 22.7 seconds at 61° C. as measured by the time required for a ⅛-inch diameter Monel metal ball to fall 20 cm. through the solution. The solution is extruded into water at 1° C. through a 40-hole spinneret. The coagulated thread is wound back and forth in the coagulating bath between a submerged, mechanically driven godet and a multi-groove roller so that the total bath travel of the thread is 4.86 meters. The thread is carried over into a stretching bath of water at 98° C. in which a 1085% stretch is applied to the thread. The thread is then wound on a bobbin, on which a water spray is applied to keep the thread wet. The gel thread is rewound and divided into a number of swatches, which are made by winding approximately 70 meters each on a bobbin, while in the gel condition, cutting the swatch off the bobbin and then tieing the loose ends together. A swatch of the acrylonitrile-allyl alcohol copolymer thread or fiber is immersed in a solution containing about 54.8 grams per liter of sodium bisulfite for three hours at 70° C. The washed and dried, treated swatch is whiter than a similar swatch which has not been treated with the sodium bisulfite solution.

Example 3

Same as Example 2 with the exception that a swatch of the acrylonitrile-allyl alcohol copolymer thread or fiber is immersed for 3 hours in a solution which is maintained at a temperature of about 70° C. and which contains 50 grams per liter of sodium hydrosulfite. The washed and dried, treated swatch is whiter than a similar swatch which has not been treated with the sodium hydrosulfite solution.

Example 4

Same as Example 3 with the exception that the solution in which the copolymer is immersed is one containing 50 grams per liter of the reaction product of sodium hydrosulfite and formaldehyde. The washed and dried swatch is whiter than a similar swatch which has not been treated with the treating solution containing the sodium hydrosulfite-formaldehyde reaction product.

The synthetic fibers produced from the spinning solutions of this invention may be produced and used in various forms, for instance in the form of a single filament (more particularly, a single continuous filament), a plurality of filaments associated in the form of a thread and which may be of any desired twist, single or multiple threads associated or twisted together, as well as in the form of cut staple fibers produced from filaments or threads and spun yarn produced from such staple fibers.

The synthetic fibers prepared from the spinning solutions of the present invention may be used in such forms as mentioned above, as well as in other forms, in the manufacture of hosiery and other articles of clothing, in flat fabrics, in making pile fabrics including upholstery, carpeting, velvets, plushes, etc., wherein the yarn may be used either in the pile and/or backing of such fabrics, in fabrics for outdoor use such as flags, sails, tarpaulins, tents, awnings, etc., in making fishing lines, fish nets, bathing suits, umbrellas, cordage (especially for marine applications), or in other uses where materials which are resistant to direct sunlight, mold growth, weather influences, etc., are desirable. These new fibers may be used alone in textile and other applications, or admixed with other natural or synthetic fibers, including cotton, nylon, the various cuprammonium, acetate and viscose rayons, wool, silk, line nylon, etc. The monofilaments may be used, for instance, in the construction of filter cloths, window screening, bristles, rattan-like fabrics for furniture, interior coverings for automobiles, floor mattings, etc.

In general, the synthetic fibers produced from the spinning solutions of this invention are characterized by having dry and wet tenacities of at least 3 grams per denier, usually at least 3.5 grams per denier and thereabove (e. g., 4 or 4.5 or more grams per denier), and dry and wet elongations of at least 10%, usually at least 12% or more (e. g., from 13 to 16% or thereabove). These new fibers have a low density and other valuable properties (e. g., resistance to moisture and to the usual solvents, resistance to mold and bacteria growth, etc.) which make them eminently suitable for uses for which many of the presently available fibers are unsuited.

The term "fiber" as used generically herein is intended to include within its meaning both monofilaments and multifilaments, as well as the various forms thereof including cut staple fibers, yarns, threads (both single and multiple threads associated or twisted together) and other forms known in the fiber and textile art, additional examples of which have been mentioned hereinbefore and in patents cited herein.

I claim:

1. A spinning solution comprising an acrylonitrile-allyl alcohol copolymer containing from about 0.6% to about 7% by weight thereof of combined allyl alcohol, said copolymer having an average molecular weight within the range of about 54,000 to about 200,000 and being dissolved in a solvent therefor.

2. A spinning solution as in claim 1 wherein the solvent is a concentrated aqueous solution of a water-soluble salt which yields highly hydrated ions in an aqueous solution.

3. A spinning solution as in claim 2 wherein the water-soluble salt is a water-soluble thiocyanate.

4. A spinning solution as in claim 3 wherein the water-soluble thiocyanate is calcium thiocyanate.

5. A spinning solution as in claim 3 wherein the water-soluble thiocyanate is sodium thiocyanate.

6. A spinning solution comprising a copolymer of acrylonitrile and allyl alcohol, said copolymer containing from about 0.6% to about 7% by weight thereof of combined allyl alcohol and yielding a solution having a specific viscosity at 40° C. within the range of 2 to 10 when 1 gram of the copolymer is dissolved in 100 ml. of 60% aqueous sodium thiocyanate solution, and said spinning solution being formed by dissolving said copolymer in a solvent comprising a concentrated aqueous solution of a water-soluble salt which yield highly hydrated ions in an aqueous solution, the concentration of said copolymer in said solvent being from 7% to 14% by weight of the solution, and the viscosity of said spinning solution, as determined by measuring the time in seconds for a Monel metal ball ⅛ inch in diameter to fall through 20 cm. of the solution at 61° C., being within the range of from 20 seconds to 200 seconds.

ARTHUR CRESSWELL.

References Cited in the file of this patent

UNITED STATES PATENTS

| Number | Name | Date |
|---|---|---|
| 2,140,921 | Hein | Dec. 20, 1938 |
| 2,332,900 | D'Alelio | Oct. 26, 1943 |
| 2,436,204 | D'Alelio | Feb. 17, 1948 |
| 2,525,521 | Caldwell | Oct. 10, 1949 |
| 2,558,730 | Cresswell | July 3, 1951 |

FOREIGN PATENTS

| Number | Country | Date |
|---|---|---|
| 883,551 | France | Mar. 29, 1943 |